(12) United States Patent
Betzen et al.

(10) Patent No.: US 9,776,504 B2
(45) Date of Patent: Oct. 3, 2017

(54) SEALING UNIT, TANK UNIT AND MOTOR VEHICLE

(71) Applicant: GM GLOBAL TECHNOLOGY OPERATIONS LLC, Detroit, MI (US)

(72) Inventors: Heiko Betzen, Bausendorf (DE); Markus Frommann, Bingen am Rhein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 406 days.

(21) Appl. No.: 14/290,534

(22) Filed: May 29, 2014

(65) Prior Publication Data

US 2014/0367384 A1   Dec. 18, 2014

(30) Foreign Application Priority Data

May 29, 2013   (DE) .................. 10 2013 009 087

(51) Int. Cl.
*B65D 41/04* (2006.01)
*B60K 15/04* (2006.01)
*B60K 15/03* (2006.01)

(52) U.S. Cl.
CPC .......... *B60K 15/0406* (2013.01); *B60K 15/03* (2013.01); *B60K 2015/03447* (2013.01); *B60K 2015/0419* (2013.01); *B60K 2015/0422* (2013.01); *B60K 2015/0451* (2013.01)

(58) Field of Classification Search
CPC ........ B60K 15/0406; B60K 2015/0419; B60K 2015/0422; B60K 2015/0432; B60K 2015/0435; B60K 2015/0445

USPC ................. 220/203.04, 367.1, 373, 86.2
See application file for complete search history.

(56) References Cited

U.S. PATENT DOCUMENTS

| 2,072,271 | A | * | 3/1937 | Meadows | F16K 1/34 137/541 |
| 3,131,718 | A | * | 5/1964 | Mingrone | F16K 17/02 137/512.1 |
| 4,431,023 | A | * | 2/1984 | Johnson | F16K 17/162 137/316 |
| 4,892,216 | A | * | 1/1990 | Scott | B60K 15/0406 220/203.07 |
| 2008/0264941 | A1 | * | 10/2008 | Hebert | F01P 11/0238 220/203.07 |

FOREIGN PATENT DOCUMENTS

| DE | 202007010026 U1 | 9/2007 |
| WO | 2003076291 A1 | 9/2003 |
| WO | 2008108690 A1 | 9/2008 |
| WO | 2011105937 A1 | 9/2011 |

\* cited by examiner

*Primary Examiner* — Steven A. Reynolds
*Assistant Examiner* — Javier A Pagan
(74) *Attorney, Agent, or Firm* — Lorenz & Kopf LLP

(57) ABSTRACT

The present disclosure pertains to a sealing unit such a fuel tank cap for a tank unit of a motor vehicle. The sealing unit includes a cover element that can be arranged on or at least partially in an opening of a tank component of the motor vehicle such that it seals the opening of the tank component in an at least fluid-tight fashion. An actuator is arranged on an outer side of the cover element that faces away from the opening. In a non-actuated, normal position rests, flat against the outer side of the cover element. The actuator can be transferred into a gripping position, in which it at least partially extends oblique or transverse to the outer side of the cover element.

15 Claims, 5 Drawing Sheets

SEALING UNIT, TANK UNIT AND MOTOR VEHICLE

CROSS REFERENCE TO RELATED APPLICATION

This application claims priority to German Patent Application No. 102013009087.3 filed May 29, 2013, which is incorporated herein by reference in its entirety.

TECHNICAL FIELD

The technical field pertains to a sealing unit such as a fuel tank cap for a tank unit of a motor vehicle, a tank unit with such a sealing unit and a motor vehicle with such a tank unit and/or with such a sealing unit.

BACKGROUND

Sealing units are utilized in motor vehicles in order to seal openings, for example, of tank units. WO 2008/108690 A1 discloses a sealing unit that is realized in the form of a fuel tank cap, in which an actuating means is in a non-actuated normal position arranged within a cover element and can be pulled out of the cover element and unfolded in order to allow a manual actuation and thusly open the fuel tank cap.

Accordingly there is a need to provide a sealing unit that has a compact design and can easily be manually actuated.

SUMMARY

According to one aspect of the present disclosure, a sealing unit for a tank unit of a motor vehicle is provided with a cover element that can be arranged on or at least partially in an opening of a tank component of the motor vehicle. The cover element seals the opening of the tank component in an at least fluid-tight fashion. An actuator is arranged on an outer side of the cover element that faces away from the opening. In a non-actuated normal position, the actuator rests flat against the outer side of the cover element. The actuator can be positioned into a gripping position, in which it at least partially extends oblique or transverse to the outer side of the cover element. The sealing unit may include a fuel tank cap of a motor vehicle. The sealing unit may furthermore include a cap for a urea tank of a motor vehicle with a diesel engine.

Since the actuator rests flat against the outer side of the cover element in the non-actuated normal position, the sealing unit is realized in a compact fashion at least in the non-actuated normal position. Since the actuator can be transferred into a gripping position, in which it extends oblique or transverse to the surface or the outer side of the cover element, it can be easily taken hold of and therefore enables a user to easily unscrew and once again screw on the sealing unit.

It would be conceivable, in principle, that the actuator can be transferred from the non-actuated normal position into the gripping position by means of a translating or sliding motion such as a displacement. However, it is advantageous if the sealing unit includes a hinge element, on which the actuator can be arranged and rotatably transferred from the non-actuated normal position into the gripping position.

In addition, the sealing unit can be operated in a particularly simple fashion if the hinge element includes at least one guide section, in which at least one projection of the actuating means can be arranged and moved in a sliding fashion and by means of which the actuator can be moved or is moved parallel to the axis of the hinge element during the transfer from the non-actuated normal position into the gripping position.

The guide section may be realized, e.g., in the form of a groove in the hinge element that extends along the circumference of the hinge element. In this case, it may extend in the circumference of the hinge element in an annular, discoidal, helical or spiral fashion. In this way, the actuating means is shifted radially outward referred to the cover element during the transfer from the non-actuated normal position into the gripping position such that the torque transmitted from the user to the sealing unit can be increased and the sealing unit therefore can be opened and once again closed in a simplified fashion.

In another embodiment of the present disclosure, the sealing unit includes at least two actuating means that are arranged on a respective hinge element or on a common hinge element and can be rotatably transferred in opposite rotating directions from the non-actuated normal position into the gripping position, in which they are essentially arranged such that they extend parallel to one another, and/or can be moved away from one another parallel to the axis of the hinge element by the guide section of the hinge element during the transfer from the non-actuated normal position into the gripping position.

In this way, the ability to open and once again close the sealing unit is additionally simplified. Furthermore, a compact design of the sealing unit is simultaneously ensured.

The hinge element can be connected to the cover element in any suitable way. For example, the hinge element and the cover element may include a common component, particularly an injection-moulded component. In one embodiment of the sealing unit, the sealing unit includes a hinge bearing unit for receiving the hinge element. The hinge bearing unit includes a first bearing on an outer section of the cover element and a second bearing that essentially can be arranged centrally on the cover element.

In an enhancement of the latter embodiment, it is proposed that the first bearing and the cover element include a common component and/or that the second bearing includes a component that is separate or can be separated from the cover element and can be separably fixed, for example clipped, or inseparably fixed on the cover element. The second bearing may furthermore include a recess, in which a spring such as a leg spring of a spring unit can be fixed.

It is furthermore advantageous if the first bearing and/or the second bearing includes at least one receptacle for the hinge element. It is particularly advantageous if the second bearing includes a receptacle for the hinge element on two opposing sides. For example, it would be conceivable to arrange a hinge element between two first bearings. In addition, a second bearing may be centrally arranged between two first bearings. A first hinge element may likewise be arranged between a first bearing and the second bearing and a second hinge element may be arranged between the second bearing and another first bearing. The axes of the hinge elements may extend coaxial or parallel to one another.

The actuator can be taken hold of more easily if the sealing unit includes a handle section that in the non-actuated normal position includes a recess in the cover element and/or in the actuating element or a projection on the cover element and/or on the actuating element. With the handle section, the actuator can be taken hold of in the non-actuated normal position.

In one embodiment, it is furthermore proposed that the actuator includes a cam section that is arranged on the other side of the rotational axis referred to the handle section and in the gripping position extends at least partially in the direction of the cover element.

In order to bias the sealing unit into the non-actuated normal position, the sealing unit may include a spring unit that biases the actuator into the non-actuated normal position. In one embodiment of the sealing unit, it is proposed that the spring unit includes a leg spring that can be fixed or is fixed in or on the second bearing. The spring force of the spring unit which includes at least one component in the circumferential direction of the hinge element acts upon the actuator in a resetting fashion. The spring unit may include a tension spring and/or pressure spring, particularly a coil spring that can be fixed or is fixed transverse or oblique to the rotational axis of the hinge element, particularly within a cavity of the cover element. The spring force of the spring unit which includes a component transverse to the rotational axis of the hinge element acts upon the actuator.

In order to simplify the arrangement of the spring unit realized in the form of a leg spring, it is advantageous if the actuator includes a recess. The coil spring of the spring unit makes it possible to bias the actuator into the non-actuated normal position. It would be conceivable, in principle, that the leg spring of the spring element likewise biases the actuator into the non-actuated normal position. In addition, the leg spring may bias the actuator into the gripping position.

In order to reduce the risk of soiling or damaging the sealing unit, it is advantageous if the sealing unit includes a holding plate that can be arranged or is arranged on the cover element on a side thereof that faces away from the actuating means. The holding plate is spaced apart from the cover element at least in the gripping position in order to arrange the sealing unit in or on a sealing unit receptacle of the motor vehicle. In this case, the sealing unit can be arranged on the sealing unit receptacle of the motor vehicle after it has been opened. This receptacle may be located on a fuel tank door of the motor vehicle. The sealing unit can be suspended in this sealing unit receptacle by means of the holding plate.

The sealing unit can be realized in a compact fashion if the spring unit includes a tappet element that protrudes into the cavity of the cover element through an opening on a side of the cover element that faces away from the outer side. The tappet element is arranged within the tension spring and/or pressure spring and forms a guide for the tension spring and/or pressure spring, as well as a cap-like terminal element, by means of which the tension spring and/or pressure spring is fixed on the tappet element, and the holding plate that extends transverse to the tappet element and is fixed on the tappet element.

In accordance with another aspect of the present disclosure a tank unit is provided with a tank component, an opening and a sealing unit having at least one of the above-described characteristics that features the cover element and can be arranged on or at least partially in the opening of the tank component of the motor vehicle. The sealing unit acts to seals the opening of the tank component in an at least fluid-tight fashion. The actuator can be arranged or is arranged on an outer side of the cover element that faces away from the opening and in a non-actuated normal position rests flat against the outer side of the cover element. The actuator can be transferred into a gripping position, in which it at least partially extends oblique or transverse to the outer side of the cover element.

In accordance with another aspect of the present disclosure the sealing unit and tank unit as described above is included within a motor vehicle with at least one of the above-described characteristics. The sealing unit, the tank unit and the motor vehicle prove to be advantageous in several respects. Since the sealing unit includes an actuator that in a non-actuated normal position rests flat against the outer side of the cover element and in a gripping position extends transverse or oblique to the outer side of the cover element, the sealing unit can be realized in a compact fashion and easily actuated in order to be opened and once again closed. Since the sealing unit includes a spring unit, the sealing unit can be biased into the non-actuated normal position. Since a holding plate is provided, the sealing unit can be arranged in an essentially corresponding receptacle after it has been removed from the opening of the tank component and protected from dirt and damages due to dropping on the ground in this receptacle.

BRIEF DESCRIPTION OF THE DRAWINGS

The present disclosure will hereinafter be described in conjunction with the following drawing figures, wherein like numerals denote like elements, and.

DETAILED DESCRIPTION

Figure 1:
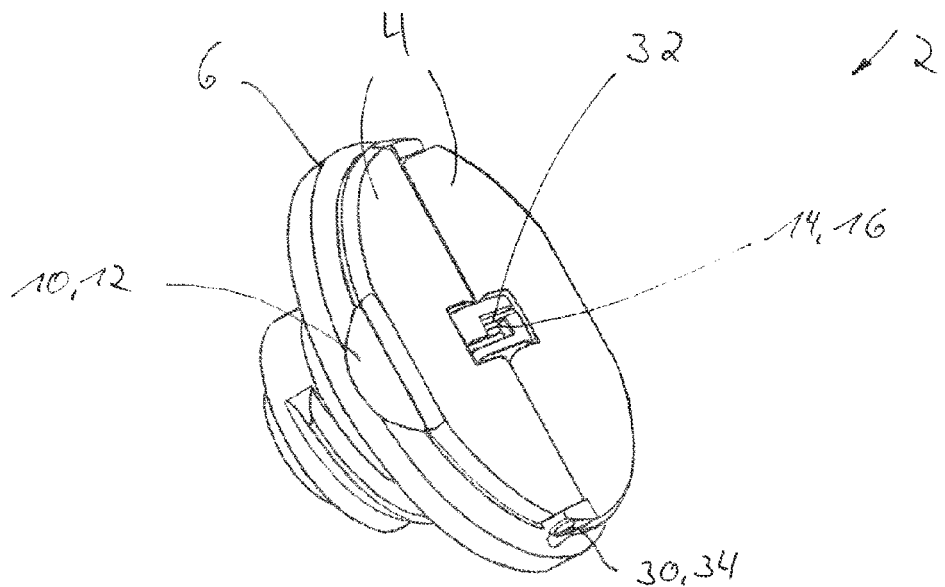
FIG. 1 shows a perspective view of a first exemplary embodiment of the sealing unit in the non-actuated normal position.

The following detailed description is merely exemplary in nature and is not intended to limit the present disclosure or the application and uses of the present disclosure. Furthermore, there is no intention to be bound by any theory presented in the preceding background or the following detailed description.

The figures show a sealing unit such as a fuel tank cap for a tank unit of a motor vehicle or a urea tank cap that is altogether identified by the reference symbol 2. The sealing unit 2 illustrated in the figure is designed for being arranged on or at least partially in an opening of a tank component of a motor vehicle and for sealing the opening of the tank component at least in a fluid-tight fashion.

In the exemplary embodiments illustrated in the figure, the sealing unit 2 respectively includes two actuators or actuating means 4 that are arranged on a cover element 6. In this case, the actuating means 4 are arranged on a surface of the cover element 6 that faces away from the opening of the tank component in the installed state. In a non-actuated normal position (FIGS. 1, 3 and 6), the two actuating means 4 are arranged such that they rest flat against the outer side of the cover element 6. The two actuating means 4 can be transferred from the non-actuated normal position into a gripping position (FIGS. 2, 4, 5 and 8), in which they extend transverse or oblique to the outer side 8 of the cover element 6. In the gripping position, the sealing unit can be easily taken hold of and removed, particularly unscrewed, from the opening of the tank component, as well as reattached, particularly screwed on.

Figure 2:
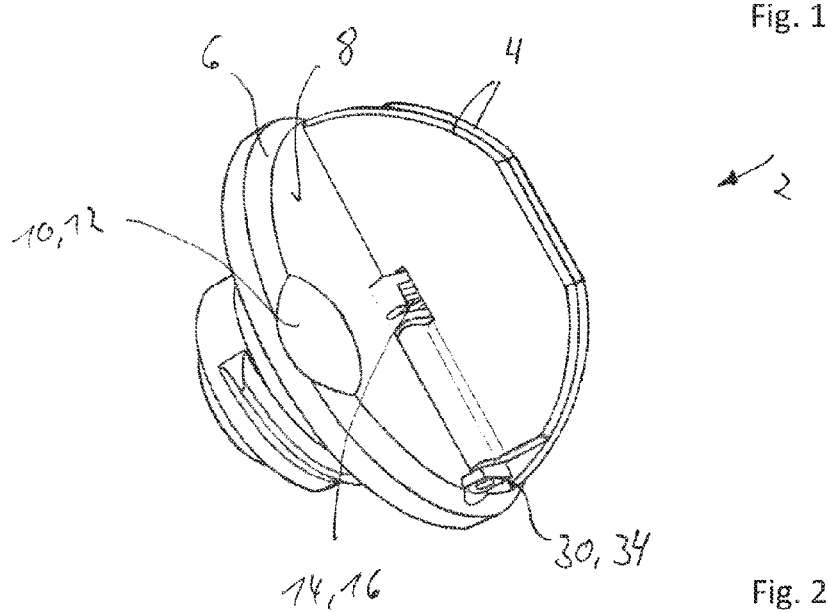
FIG. 2 shows a perspective view of the first exemplary embodiment according to FIG. 1 in the gripping position.

FIGS. 1 and 2 show a first exemplary embodiment of the sealing unit 2. FIG. 1 shows the first exemplary embodiment of the sealing unit 2 in the non-actuated normal position. FIG. 2 shows the first exemplary embodiment of the sealing unit 2 in the gripping position.

In order to easily take hold of the actuating means 4, the sealing unit 2 includes a handle section 10 that in the exemplary embodiments illustrated in FIGS. 1 to 8 respectively includes a recess 12 in the cover element 6.

In order to bias the two actuating means 4 of the exemplary embodiment illustrated in FIGS. 1 and 2 into a non-actuated normal position, the sealing unit 2 includes a spring unit 14 that features at least one leg spring 16, wherein each leg of the leg spring 16 is respectively fixed on one actuating means 4.

Figure 3:
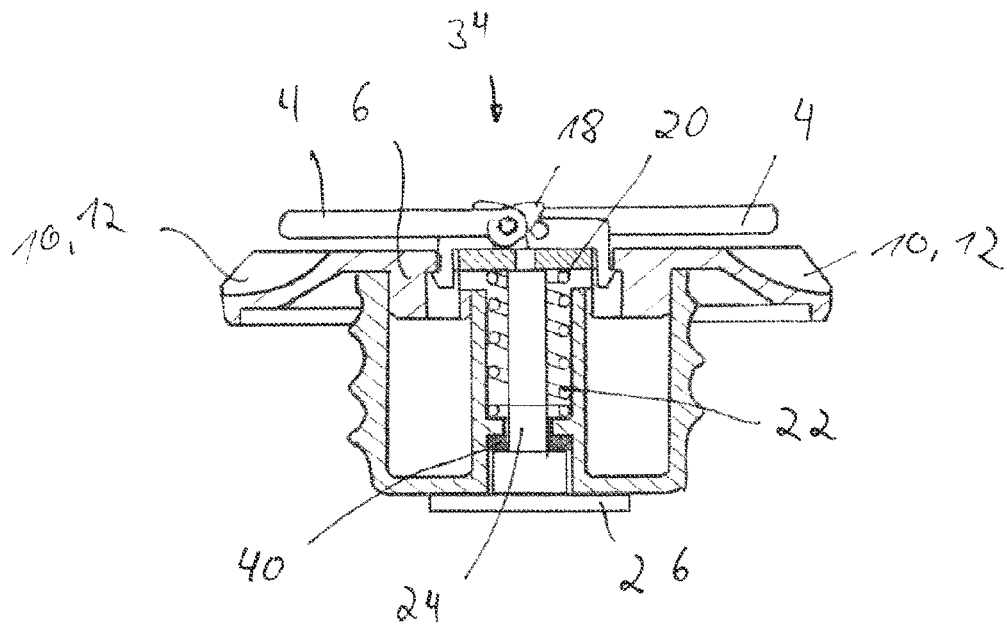
FIG. 3 shows a sectional view of a second exemplary embodiment of the sealing unit in the non-actuated normal position.
Figure 4:
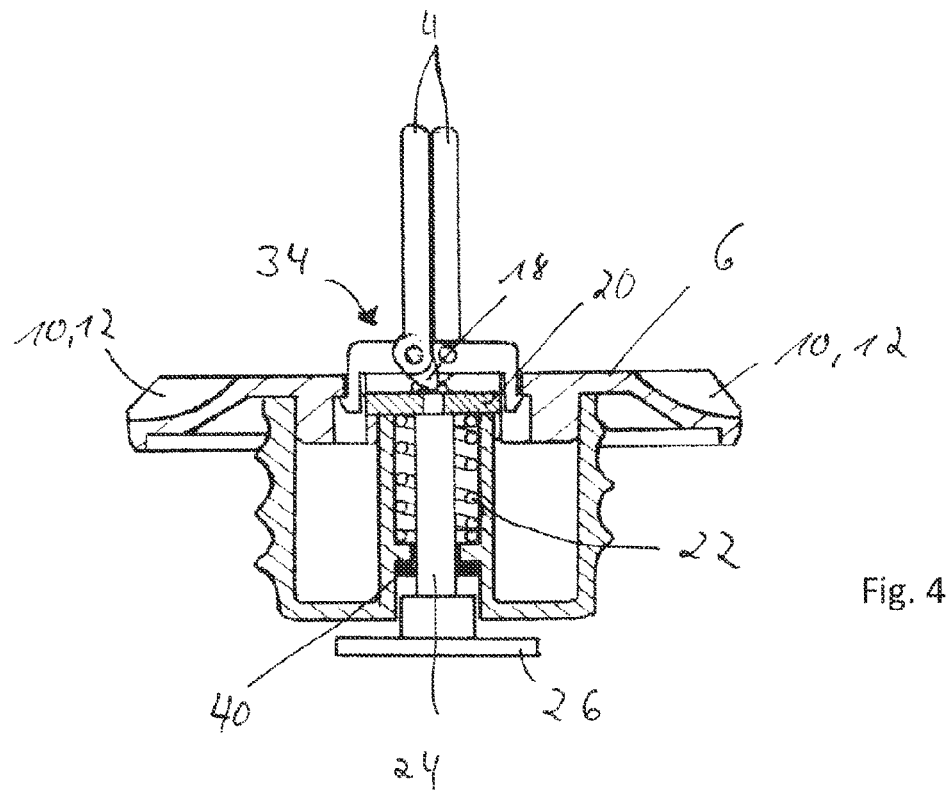
FIG. 4 shows a sectional view through the second exemplary embodiment of the sealing unit according to FIG. 3 in the gripping position.
Figure 5:
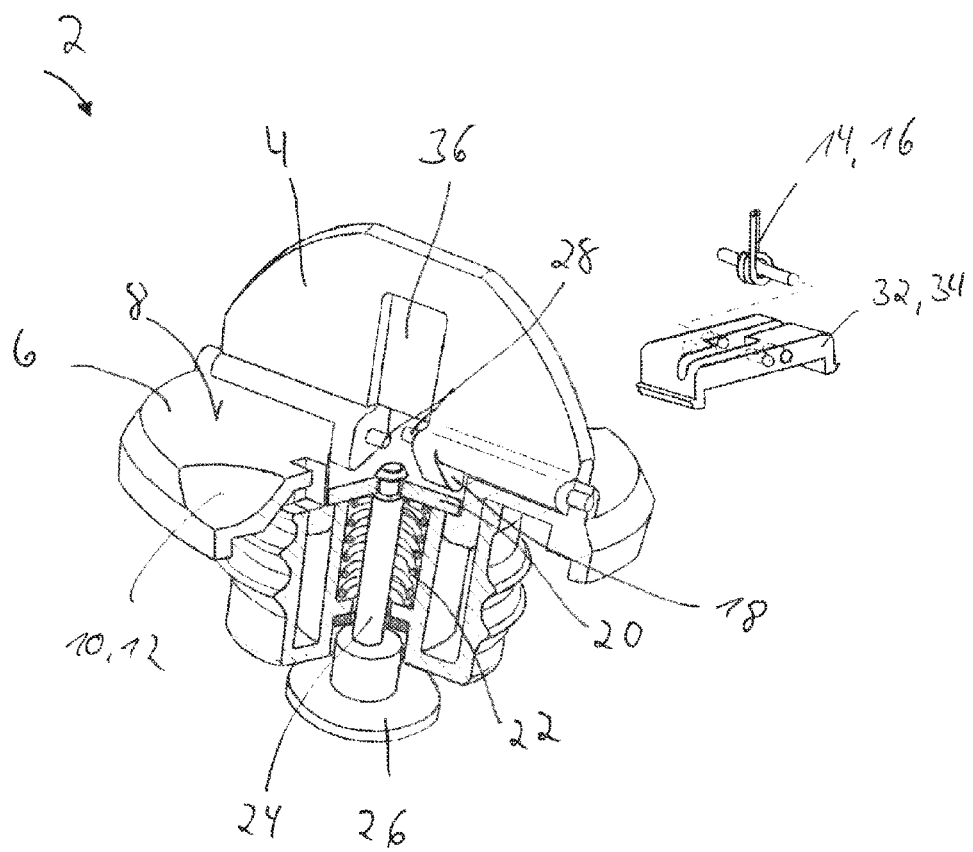
FIG. 5 shows a partially sectioned perspective view of the second exemplary embodiment of the sealing unit according to FIG. 4 in the gripping position.

For this purpose, the actuating means 4 may respectively include a cam section 18 that in the gripping position extends in the direction of the cover element 6 as shown in FIGS. 3 to 5. This cam section 18 of the actuating means 4 rests against a cap-like terminal element 20 that displaces the actuating means in the direction of the cover element 6 during the transfer from the non-actuated normal position into the gripping position. A tension spring and/or pressure spring 22 of the spring unit 14, by means of which the two actuating means 4 are biased into the non-actuated normal position via the cam sections 18, act against this displacement. The tension spring and/or pressure spring 22 of the spring unit 14 is fixed on a tappet element 24 under prestress by means of the terminal element 20.

In order to guide the actuating means 4 during the transfer from the non-actuated normal position into the gripping position, the sealing unit 2 includes at least one hinge element 28 (illustrated, in particular, in FIGS. 5 and 7), by means of which an actuating means 4 respectively can be rotatably transferred from the actuated normal position into the gripping position. In this case, the at least one hinge element 28 is held by a first bearing means 30 on one side and by a second bearing means 32 of a hinge bearing unit 34 on the other side.

In the exemplary embodiments illustrated in the figures, the first bearing means 30 of the hinge bearing unit 34 is realized in one piece with the cover element. The second bearing means 32 of the hinge bearing unit 34 can be fixed, particularly clipped, on the cover element 6. In the exemplary embodiments illustrated in the figures, the hinge elements 28 are arranged parallel to one another such that it is possible to transfer the actuating means 4 from the non-actuated normal position into the gripping position in opposite rotating directions. In addition, the exemplary embodiments include sealing means 40 that are arranged on a lower end of the tappet element 24. The sealing unit 2 includes a holding plate 26 that can be arranged or is arranged on the cover element 6 on a side thereof that faces away from the actuating means 4. The holding plate 26 is spaced apart from the cover element 6 at least in the gripping position in order to arrange the sealing unit 2 in or on a sealing unit receptacle (not shown) of the motor vehicle. In this case, the sealing unit 2 can be arranged on the sealing unit receptacle of the motor vehicle after it has been opened. This receptacle may be located on a fuel tank door (not shown) of the motor vehicle. The sealing unit 2 can be suspended in this sealing unit receptacle by means of the holding plate 26.

FIG. 5 shows a second exemplary embodiment of the sealing unit 2, in which a continuous recess 36 is respectively provided in an actuating element 4. Due to this recess, the sealing unit 2 can be realized with a reduced weight.

Figure 6:
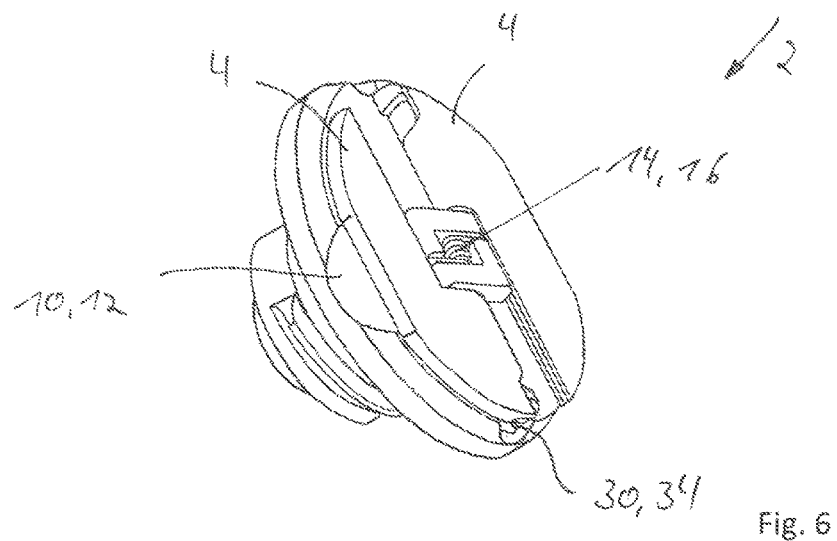
FIG. 6 shows a perspective view of a third exemplary embodiment of the sealing unit in the non-actuated normal position.
Figure 7:
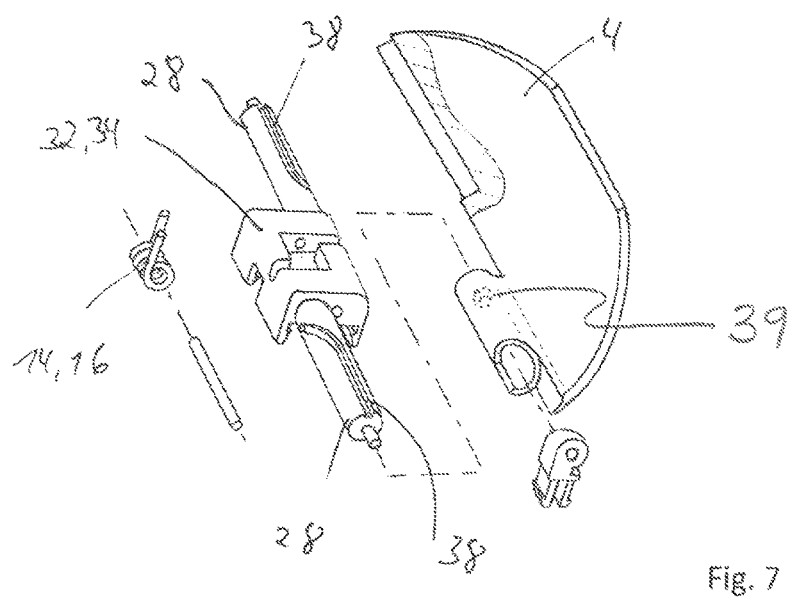
FIG. 7 shows an exploded view of the components of the exemplary embodiment according to FIG. 6.
Figure 8:
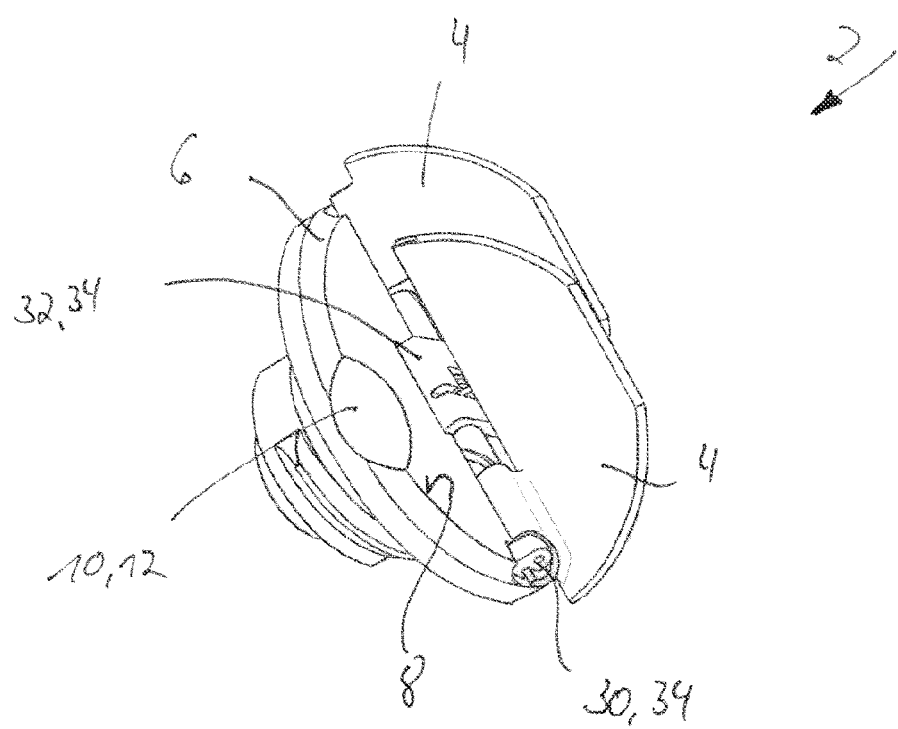
FIG. 8 shows a perspective view of the third exemplary embodiment of the sealing unit according to FIG. 6 in the gripping position.

FIGS. 6 to 8 show a third exemplary embodiment of the sealing unit 2, in which the hinge elements 28 respectively include a guide section 38. In this guide section 38, the actuating means 4 includes a projection 39 that is received in the guide section 38. This causes the actuating means 4 to move outward along the axis of the hinge elements 28 during the transfer from the non-actuated normal position into the gripping position. In this way, the leverage available to the user is increased and the sealing unit respectively can be opened and once again closed in a simplified fashion.

While several exemplary embodiments have been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A sealing unit for a tank unit of a motor vehicle comprising:
    a cover element configured to be at least partially received in an opening of a tank component of the motor vehicle such that it seals the opening thereof in a fluid-tight fashion;
    a hinge element having a rotational axis and a guide section,
    an actuator having a projection arranged on the hinge element facing away from the opening, the projection received in the guide section and the actuator positionable between a non-actuated normal position resting flat against the outer side of the cover element in a first position along the rotational axis and a gripping position extending oblique to the outer side of the cover element in a second axial position along the rotational axis;
    wherein the actuator is displaced along the rotational axis from the first position to the axial position as the actuator rotates about the rotational axis from the non-actuated normal position into the gripping position.

2. The sealing unit according to claim 1 further comprising two actuators are arranged on the hinge element which and can be rotatably transferred in opposite rotating directions from the non-actuated normal position into the gripping position, wherein the two actuators are arranged such that they extend parallel to one another in at least the non-actuated normal position.

3. The sealing unit according to claim 1 further comprising a hinge bearing unit receiving the hinge element, the hinge bearing unit having a first bearing on an outer section of the cover element and a second bearing arranged centrally on the cover element.

4. The sealing unit according to claim 3, wherein the first bearing and the cover element comprise a common component, and wherein the second bearing comprises a component that is separate from the cover element affixed on the cover element.

5. The sealing unit according to claim 3, wherein the first bearing and the second bearing comprises at least one receptacle for the hinge element.

6. The sealing unit according to claim 1 further comprising a handle section including a recess formed in at least one of the cover element or the actuator for taking hold of the actuator in the non-actuated normal position.

7. The sealing unit according to claim 1 further comprising a handle section including a projection formed on the actuator for taking hold thereof in the non-actuated normal position.

8. The sealing unit according to claim 1, wherein the actuator comprises a cam section arranged on a side opposite the rotational axis, wherein the cam section extends at least partially into the cover element when the actuator is positioned into the gripping position.

9. The sealing unit according to claim 1 further comprising a spring unit biasing the actuator into the non-actuated normal position.

10. The sealing unit according to claim 9, wherein the spring unit comprises a leg spring imparting a spring force in at least a circumferential direction of the hinge element and acting upon the actuator in a resetting fashion.

11. The sealing unit according to claim 9, wherein the spring unit comprises a coil spring fixed transverse to the rotational axis of the hinge element imparting a spring force in at least a direction transverse to the rotational axis of the hinge element and acting upon the actuator.

12. The sealing unit according to claim 11, wherein the coil spring is disposed within a cavity formed in the cover element.

13. The sealing unit according to claim 1 further comprising a holding plate arranged on the cover element on a side opposite the actuator, the holding plate being spaced apart from the cover element at least in the gripping position for arranging the sealing unit in a sealing unit receptacle.

14. The sealing unit according to claim 1 further comprising:
a tappet element that protrudes into a cavity of the cover element through an opening on a side of the cover element that faces away from the outer side;
a spring element disposed over the tappet element and forms a guide for the spring element; and
a cap-like terminal element fixing the spring element on the tappet element.

15. A tank unit comprising:
a tank having an enclosed storage volume and an opening providing access to the enclosed volume; and
a sealing unit at least partially arranged in the opening such that it seals the enclosed storage volume in a fluid-tight fashion, the sealing unit including:
a cover element configured to be at least partially received in an opening of a tank component of the motor vehicle such that it seals the opening thereof in a fluid-tight fashion;
a hinge element having a rotational axis and a guide section,
an actuator having a projection arranged on the hinge element and facing away from the opening, the projection received in the guide section and the actuator positionable between a non-actuated normal position resting flat against the outer side of the cover element in a first position along the rotational axis and a gripping position at least partially extending oblique to the outer side of the cover element in a second position along the rotational axis;
wherein the actuator is displaced along the rotational axis from the first position to the axial position as the actuator rotates about the rotational axis from the non-actuated normal position into the gripping position.

* * * * *